July 26, 1927.
H. HILL
FLEXIBLE COUPLING
Filed July 22, 1925     4 Sheets-Sheet 1
1,636,692
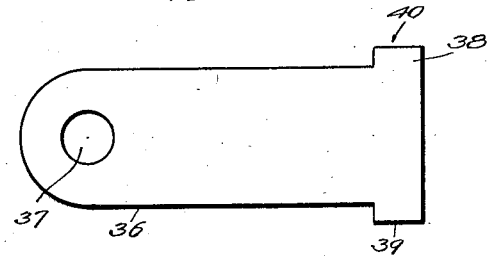
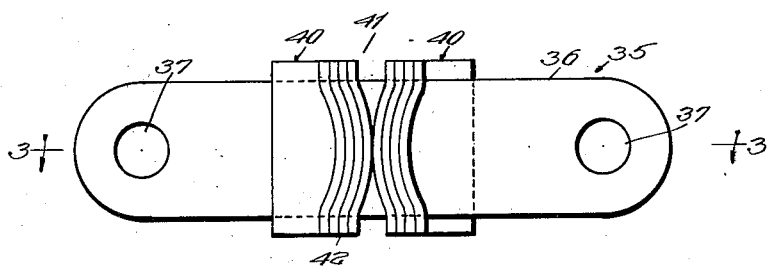
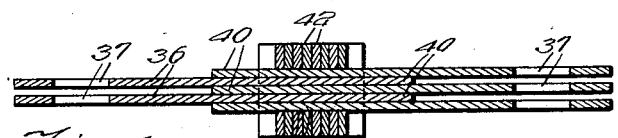
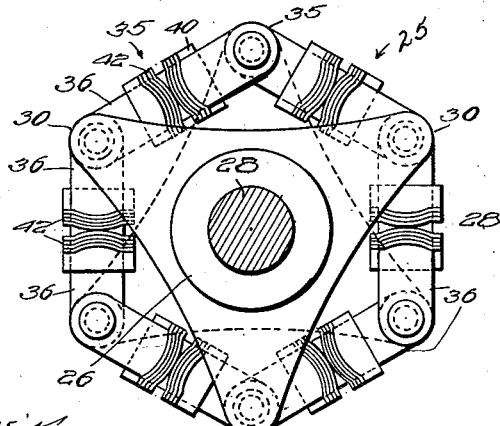
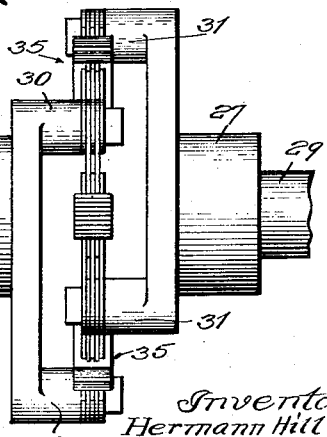
Inventor
Hermann Hill

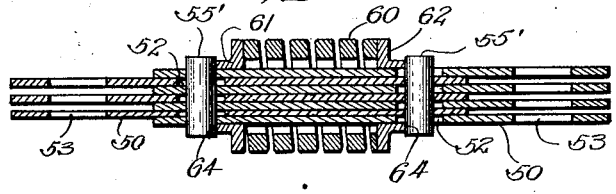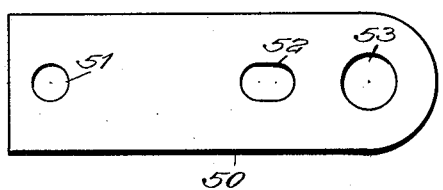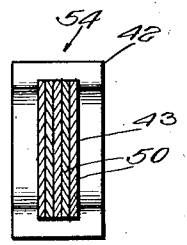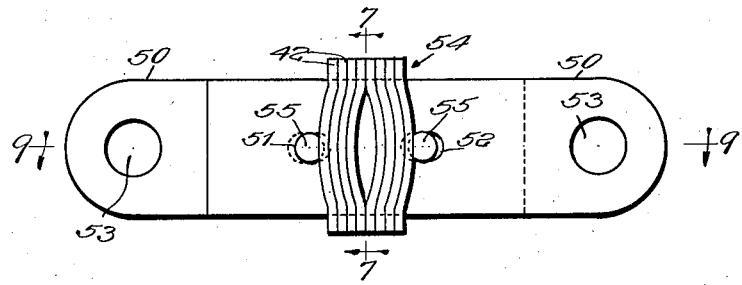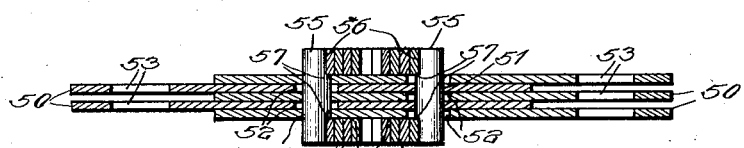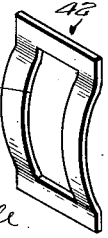

July 26, 1927.

H. HILL

FLEXIBLE COUPLING

Filed July 22, 1925

Witnesses:
William P. Kilroy
Harry R. Levhite

Inventor
Hermann Hill
By Brown Boettcher Dunne
Attys

July 26, 1927.  
H. HILL  
1,636,692  
FLEXIBLE COUPLING  
Filed July 22, 1925    4 Sheets-Sheet 4

Witnesses:
William P. Kilroy
Harry A. Lukitt

Inventor.
Hermann Hill
By
Attys.

Patented July 26, 1927.

1,636,692

UNITED STATES PATENT OFFICE.

HERMANN HILL, OF FREDONIA, NEW YORK.

FLEXIBLE COUPLING.

Application filed July 22, 1925. Serial No. 45,160.

The present invention in general relates to joints and more particularly to flexible couplings such, 'for example, as those employed for mechanically interconnecting rotating elements. I have reference, specifically speaking, to those joints or couplings employed as torque transmitting devices. In practice, such couplings are used quite extensively for connecting shafts or axles in automatic drive assemblies and are commonly termed universal joints.

I propose to provide a coupling having a much higher degree of flexibility than analogous couplings of heretofore and one which is adapted to cause the elements or shafts associated therewith to revolve smoothly even though they may not be in mechanical alignment and to practically eliminate the jar incident to starting and stopping of either of the shafts. I also propose to provide a coupling which compensates for momentary lagging on the part of either of the rotating elements connected thereto.

I am aware that couplings somewhat analogous to that to be described in the present application are in existence at the present time. My coupling, as shall become more apparent as the accompanying description progresses, differs from these couplings in the type of links employed. The couplings I refer to are those utilizing either corrugated spring links or flat links composed of leather or some similar substance in place of my novel link mechanism.

The couplings using leather links and the like have not proven very satisfactory due to their limited life. That is to say, the leather comprising the link stretches considerably after having been in use a short time and deteriorates very rapidly, especially when subjected to moisture. Then too, these leather links are objectionable on account of their prohibitive cost of construction. Also, such links do not have the requisite amount of flexibility and hence are not able to efficiently and satisfactorily meet the conditions and requirements to which an ordinary coupling is exposed.

The couplings having corrugated spring links were designed subsequent to couplings employing leather links and are to a certain extent an improvement over the earlier type of couplings. I have found, however, in practice, that the corrugated spring link is objectionable upon much the same grounds as the leather link. It is true that the corrugated spring links are manufactured at a much less cost than the leather links. It is also a fact that these links are more flexible and have a greater life than the leather links. On the other hand, however, the corrugated spring links are not as flexible as the conditions to which they are exposed demand and also in use they tend to lose their resiliency after a very short lapse of time. Moreover, these links do not respond to and compensate for the minute and more rapid fluctuations in rotation to which the elements of an ordinary coupling are exposed such, for example, as the momentary lagging on the part of either of the rotating elements associated therewith. In order to attain the most efficient results, the links of the coupling must react positively and quickly to all variations in rotation and jars incident to the rotating elements.

I have, through experimentation, ascertained, with a reasonable degree of certainty, the conditions which couplings must be capable of accommodating in order to function efficiently as torque transmitting devices. These conditions will be fully explained in the accompanying descriptive matter. It suffices at this stage in the application to state that not only must the links of the coupling cushion the jars incident to starting and stopping of the rotating elements thereof, but they must be, in addition, capable in taking care of longitudinal play between its rotating elements, of responding to axial twisting and of lengthening so as to enable the shafts to run smoothly even though they are unaligned.

I propose, in accordance with the features of the present invention, to provide a coupling wherein the links thereof are adapted to meet all of the conditions and requirements to which the coupling is exposed when in service.

I also propose to provide a coupling link consisting of a plurality of overlapped flexible spring leaves which function as non-stretching tension members and a resilient member which functions as the lengthening medium of the link; the tension members or spring leaves responding to the longitudinal play between the members of the coupling and being capable of axial twisting and the resilient means being adapted to permit elongation of the link proper, by being compressed between the associated spring leaves, so as to permit the rotating elements of the coupling to run smoothly even though they are unaligned.

An object of the present invention is to provide an improved coupling.

Another object of the present invention is to provide in a coupling improved link mechanism.

A further object of the present invention is to provide a flexible link including tension and resilient members, each of which are of a simple and inexpensive nature and are readily removable for inspection or replacement.

A still further object of the present invention is to provide a coupling which is adapted to meet all the requirements and conditions to which it may be exposed in service.

Other objects and advantages of the present invention will more fully appear from the following detailed description taken in connection with the accompanying drawings, which illustrate several embodiments thereof, and in which:

Figure 1 is a view of a link embodied with the features of the present invention;

Figure 2 is a view of one element or half-link comprising the link illustrated in Figure 1;

Figure 3 is a sectional view taken on the line 3—3 of Figure 1 looking in the direction indicated by the arrows;

Figure 4 is an end view partly in section of a coupling in which links like that illustrated in Figure 1 are employed;

Figure 5 is a side view of the coupling illustrated in Figure 4;

Figure 6 is a view of a modified form of the link;

Figure 7 is a sectional view taken on the line 7—7 of Figure 6;

Figure 8 is a view of one of these elements or half-links comprising the link illustrated in Figure 6;

Figure 9 is a sectional view taken on a line 9—9 of Figure 6 looking downwardly;

Figure 10 is a perspective view of one of the resilient members employed in the links illustrated in Figures 1 and 6;

Figure 11 is a perspective view of one of the pins illustrated in Figure 6;

Figure 16 is a sectional view taken on a line 16—16 of Figure 14 looking in the direction indicated by the arrows;

Figure 12:
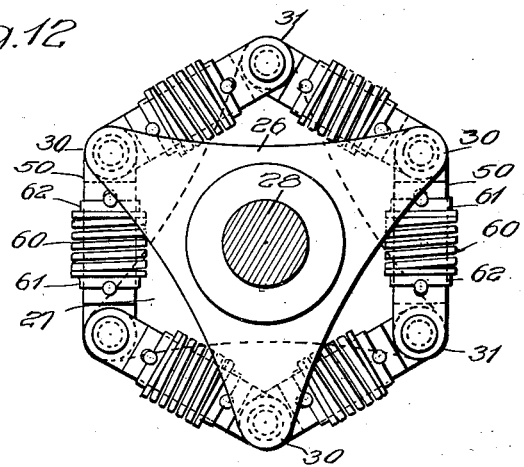
Figure 12 is an end view partly in section, of a modified form of coupling.

Referring now to the drawings, in detail, in which like reference numerals designate similar parts throughout the several views, 25 denotes a coupling (Figures 4 and 5), embodied with the features of the present invention. The coupling 25 includes a pair of spiders 26 and 27 splined to shafts 28 and 29, respectively. Either of the shafts 28 or 29 may be driven, it in no way affecting the torque transmitting ability of the coupling 25. The spider 26 is provided with a plurality of fastening lugs 30 and the spider 27 is provided with a plurality of fastening lugs 31. In the embodiment of the invention illustrated in Figures 4 and 5, I have shown each of the spiders as having three fastening lugs. It is to be understood, however, that the number of these lugs may be increased and decreased without, in any way, affecting the present invention and that the invention is only to be limited in so far as defined by the scope and spirit of the appended claims.

The spider 26 is connected to the spider 27 by a series of links designated generally by reference numeral 35, embodied with the features of the present invention. The link 35, employed in the construction illustrated in Figure 4, is shown on an enlarged scale in Figure 1. I consider this form of link the preferred of those I shall describe in the present application. One end of each of the links 35 is connected to the lug 30 on the spider 26 and the other end thereof is connected to the lug 31 on the spider 27. The links 35 may be fastened to the spider lugs in any desirable or suitable manner.

The links 35 in the coupling 25 are arranged in a closed circuit and their ends overlap the ends of the adjacent links. That is to say, to each fastening lug 30—31 the ends of two links 35 are secured. The series of links 35 in the coupling 25 form a hollow hexagon. At three of the angles of the hexagon, the links are secured to one of the spiders and at the other three angles of the hexagon, the links are secured to the other spider. Thus the hexagon of links is secured at every other angle to one spider and at the intermediate angles to the other spider.

Each of the links 35 includes a plurality of elements or half-links 36 (Fig. 2). The half-link 36 is provided with an aperture 37 at one end and projections 38 and 39 at the other end. These projections 38 and 39 extend laterally from the half-link proper to cause the end of the half-link to resemble a T in shape. I shall hereinafter designate the T end of the half-link 36 as the abutment end 40 of the link. The aperture 37 in the half-link 36 is used to secure the half-link to the fastening spider lug or stud.

As shown in Figures 1 and 3, each link 35 is composed of two sets of half-links 36. The half-links in one set are spaced from each other and the half-links in the other set are inserted in the spaces formed thereby. This results in the abutment ends 40 of one set of half-links or what might be termed beads overlapping the abutment ends of the other set of half-links. In other words, the half-links in one set are separated from each other by the half-links of the other set.

Surrounding the overlapped portions of the half-links 36 in the link 35 is a laminated compression spring 41 which consists of a plurality of spring members 42, such as that shown, perspective in Figure 10. It should be noted that one-half of these members are arranged to face in one direction in the link and the other half of the members are arranged to face in the other direction, so that they are pressed together at their centers. This results in the member 41 having the requisite amount of resiliency. The spring 41 is disposed intermediate the abutment ends 40 of one set of half-links and the abutment ends 40 of the other set of half links. Thus, it is apparent that by pulling the ends of the link 35 in opposite direction, the abutment ends of the half-link will compress the spring 41. Also, it is evident that the half-links of one set comprising the link 35 will, of necessity, have to slide upon the half-links of the other set.

In the assembly of the link 35, the spring members 42 are first arranged in the position above described. The small end of a half-link is then inserted from one side until its abutment end 40 rests against the spring member on that side. Another half-link is then inserted in the spring member from the other side, until its abutment end 40 rests against the spring members on that side. Each of the spring members 42 are provided with an aperture 43 substantially rectangular in shape through which the link members or half-links pass. I find it desirable to insert at least two half-links through the apertures 43 in the spring members 42 from one side, and at least three from the other side. Each half-link of the set of three on one side being separated by one of the half-links on the other side, (Fig. 3). I desire it understood, however, that my invention is not to be limited to the number of half-links employed, inasmuch as the number may be varied to suit the particular requirements to which the link is subjected.

The half-links 36 constitute the tension members of my links and are preferably made of steel. Good results are attainable with vanadium steel which has been properly heat treated. The spring members 42 comprising the laminated spring 41 constitute the resilient medium of my links. It is through the compression spring 41 that elongation of the link is permitted. Obviously, although the compression spring 41 permits the stretching of the link 35, it would also function to return the half-links to their normal positions thereafter. All of the parts composing the link 35 may be very economically manufactured from sheet metal by any conventional type of punch press, in a manner well known to those versatile with the art. Also, the parts, upon being worn, may be very easily removed from the link 35 and replaced.

In Figures 6 to 9 inclusive, and 11, I have illustrated a modified form of link. The link, in this instance, consists of the plurality of half-links or tensions members 50, each being provided with three apertures 51, 52 and 53. It should be noted that the half-links 50 are not provided with abutment ends as was the case with half-links 36. The apertures 53 in the half-links 50 are used to fasten the links to the bosses or lugs on the spiders in the same manner as the half-links 36 are fastened to their spiders. This modified form of link is also provided with a compression spring 54, consisting of a plurality of laminations, or spring members 42, such as that shown in Figure 10. The spring members 42 in this form of link are arranged in an opposite manner to the way they were arranged in the link 35. That is to say, they are arranged end to end rather than center to center. One-half of the spring members 42 comprising the spring 54 are arranged to face in one direction and the other half are arranged to face in the other direction; the ends of the innermost members coming together.

In assembling this modified form of link, the half-links 50 are inserted in the apertures 43 of the members 42 from opposite sides alternatively in much the same manner as they were assembled in the case of the link illustrated in Figure 1. It should be noted, at this time, that the aperture 52 is not circular in form, the purpose of which will be more fully described hereinafter.

The half-links 50 on one side of the spring 54 are arranged in such a position with respect to the half links on the other side thereof, as to have their apertures 51 and 52 to coincide with the apertures 52 and 51, respectively, of the links on the other side. That is to say, the apertures or holes 51 of one set of half-links are positioned directly over the apertures or holes 52 of the other set of half-links. Positioned in the apertures or holes 51 and 52 of the assembled half-links 50 are pins 55, such as that illustrated in Figure 11. One of these pins is disposed on each side of the resilient member 54. The pin 55 is provided with two cutaway portions 56 to form shoulders 57. The shoulders 57 (Fig. 9), fit in the aperture 43 of the outside spring member 42. The cutaway portions 56 engage the edges of the spring member 42. The spring members 42 being at all times stretched outwardly will thus be enabled to hold the pins 55 in position due to the shoulders 57 thereon. This is an ideal construction, inasmuch as it enables a simple rugged and strong construction.

It is evident that the link, illustrated in Figure 6, upon being pulled in opposite directions at its ends, will be permitted to stretch. That is to say, the enlarged holes or apertures 52, permit the half-link 50 on one side of the spring 54 to be moved outwardly from the half-link 50 on the other side of the spring 54. The pins 55 serve to limit the amount of movement or elongation of the half-links. The spring members 54, in this form of the link, also serve to return the half-links to their normal positions. This link, although not as simple in construction as link 35, functions in the same manner as link 35 and is adapted to compensate for any variation in the rotation of the elements associated with the couplings.

Figure 13:
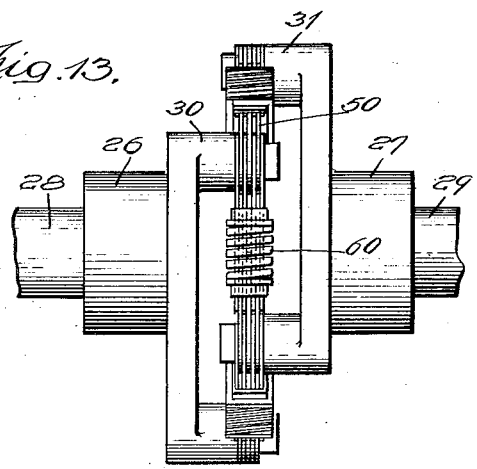
Figure 13 is a side view of the coupling illustrated in Figure 12.

In Figures 12 to 16, inclusive, I have illustrated a third modification of my novel link mechanism. The coupling illustrated in Figures 12 and 13 is of the same general type as that illustrated in Figures 4 and 5, and like reference numerals designate similar parts in both forms of couplings. The coupling illustrated in Figures 12 and 13 differs from that illustrated in Figures 4 and 5, in the series of links employed. I, therefore, shall now proceed to describe, in detail, the link I employ in this coupling.

Figure 15:
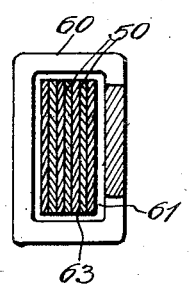
Figure 15 is a sectional view taken on a line 15—15 of Figure 14.
Figure 14:
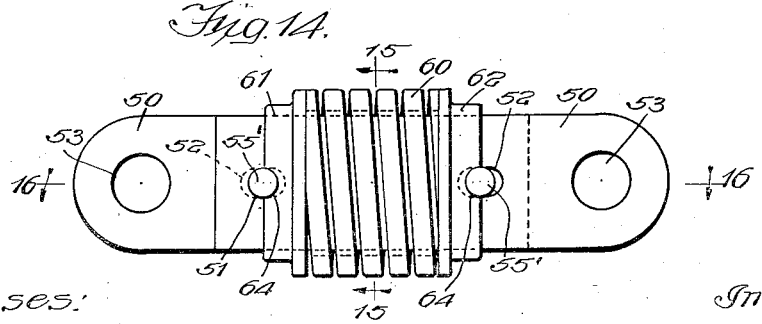
Figure 14 is a view of one of the links employed in the coupling shown in Figure 12.

The link shown in Figure 15 is made up of a plurality of half-links 50 assembled in the same manner as the half-links were in the link illustrated in Figure 6. This link differs from that illustrated in Figure 6 in the type of spring member employed. In the embodiment, under consideration, instead of a laminated spring 54, I employ a spiral compression spring 60 secured at its ends to plates 61 and 62. Each of the plates 61 and 62 are provided with an aperture 63 (Fig. 15) through which the half-links are passed. Also, each of the plates are equipped with an arcuate shaped aperture 64 for receiving the ends of the pins 55′. The pins 55′ serve to retain the spring 60 in position in the same manner the pins 55 do in the case of the spring 54. Obviously, when the ends of this link are pulled in opposite directions, the links will be permitted to stretch, due to the apertures 52 in the half-links 50 in the same manner as in the case of the links illustrated in Figure 6.

The operation of my novel couplings is as follows:

Since each of the three forms of links illustrated in the accompanying drawings function identically, a description of a coupling embodied with one of them will suffice for all three. Therefore, I shall proceed to describe the operation of the type of link illustrated in Figure 1, which, as I have already mentioned, I deem the preferred form of the three disclosed.

In order to facilitate the description of the operation of my coupling, I have illustrated diagrammatically, in Figures 17 to 21, inclusive, the manner in which the links of the couplings act in operation.

Figure 17:
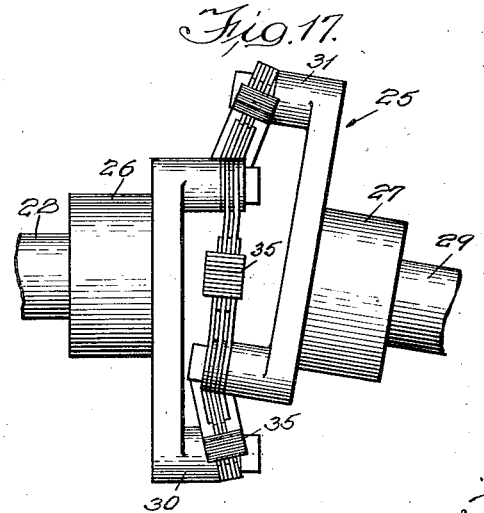
Figure 17 is a more or less diagrammatic view of a coupling illustrating how it looks when its shafts are unaligned.

The coupling illustrated in Figure 17 is substantially the same as that shown in Figure 5 with the exception that the shaft 29 is at an angle with respect to the shaft 20. In other words, the shafts are unaligned. This, as is apparent, results in the spider 27 being at an angle with respect to the spider 26. The lower portion of the spider 27 is moved closer to the spider 26 whereas its upper portion is moved away from the spider 26. This naturally results in the two upper and two lower links in the series of links, or rather the hexagon of links, to be elongated. This is necessarily true, inasmuch as the distance between the fastening bosses or studs associated with the aforementioned links is increased. The other two links, of the hexagon, or vertical links of the series remain unaffected since the distance between their bosses has not been increased. Obviously, therefore, each link, in making one complete revolution, must expand and contract twice during its revolution, in order for the shafts 28 and 29 to run smoothly. The links, in order to function thus, must not only have a relatively high degree of flexibility but must be capable of contracting very quickly when it passes its position of elongation.

Figure 18:
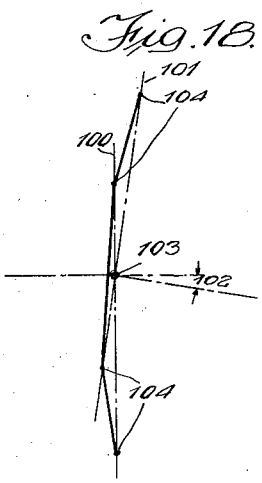
Figure 18 is a view illustrating diagrammatically the position of the links of a coupling when its rotating elements are unaligned.

In Figure 18, I have illustrated still more diagrammatically what happens when the shafts connected to a coupling are unaligned. In this Figure, 100 indicates the plane of the driven shaft 28 and 101 denotes the driven shaft 29. By reference numeral 102, I have designated the angle at which the shaft 29 is to the shaft 28. The true center is indicated by reference numeral 103. The points 104 indicate the bosses of the spider. This sketch clearly substantiates what has been said before in regard to Figure 17. That is to say, when the shafts are unaligned, each link must be expanded and contracted twice during each revolution that it makes. Also, when the shaft that is unaligned extends downwardly, the two vertical links of the hexagon link construction or series of links do not expand and contract, since the distance between their fastening points 104 does not vary.

Now, from the foregoing, it is evident that the link 35, in making one revolution, is elongated twice during that revolution. The spring 41 thereof is compressed between the abutment ends 40 of the half-links; the tension of the opposite half-links acting upon the outside of the said spring. As soon as the link 35 is moved out of its elongated position, the compression spring 41 re-acts to draw the half-links thereof together again into their normal positions. The action of the compression spring 41 is positive, rapid and furnishes adequate flexibility to the links. When the link 35 is lengthened, another action which I shall refer to as the angular edgewise displacement of the half-links occurs. This angular displacement is illustrated clearly in the diagrammatic view shown in Figure 21. The half-links comprising the link 35 are enabled to assume the positions, roughly illustrated in Figure 21, due to the inherent features of the design of the link. This angular edgewise displacement action occurs contemporaneously with the lengthening of the links. This angular displacement action, however, causes no uneven tension in the links since the compression spring adapts itself to the projections of the links, whatever position they may assume.

Figure 19:
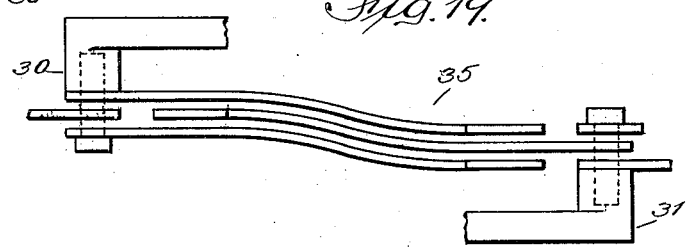
Figure 19 is a diagrammatical view illustrating how my novel links react to compensate for longitudinal play between the spiders of a coupling.

In Figure 19, I have illustrated the manner in which the links 35 compensate for parallel flexing of the coupling members. By parallel flexing, I mean such movement caused between the spiders of the couplings by a slight amount of longitudinal play between the two rotating shafts associated therewith; as for instance the play existent between the shaft of the motor and the shaft of the generator connected thereto. Although the shape assumed by the link illustrated in Figure 19 is exaggerated, still it clearly shows how my novel tension members or half-links are flexed.

Figure 20:
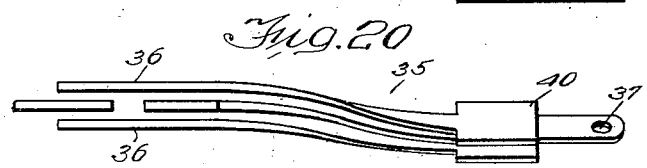
Figure 20 is a diagrammatic view illustrating axial twisting of a link.
Figure 21:
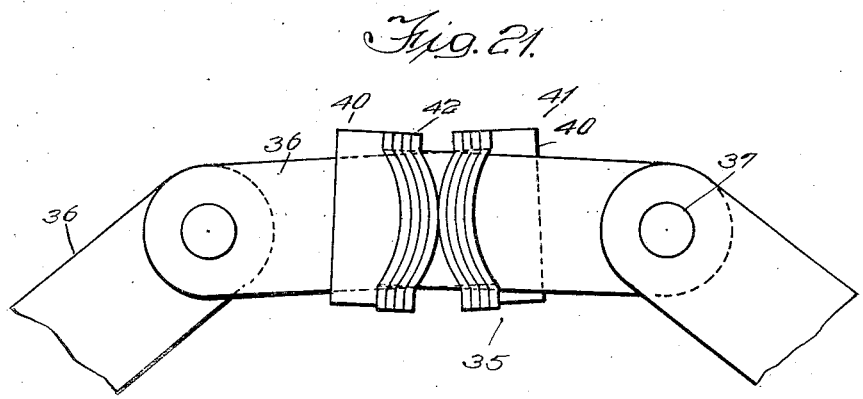
Figure 21 is a diagrammatic view of a link embodied with the features of the present invention showing it angularly displaced edgewise.

It is the fact that when the shafts associated with the couplings are angularly displaced that a certain amount of axial twisting of the links occurs. The sketch shown in Figure 20, illustrates roughly the manner in which my novel half-links respond in such a case. My novel half-links, due to their sliding engagement, are adapted to move in practically any direction without interfering with the smoothness of rotation of the coupling.

From the above description, it is evident that my novel links are capable of transmitting force and yet are adapted, at the same time, capable of radial movement and also of slight relatively angular movements, such as those caused in a flexible coupling between the two shafts thereof which may be slightly out of parallellism or out of alignment either angularly or in parallel planes.

In practice upon the starting of the driving shaft of the coupling the resilient or spring means associated with each of my links is compressed and obviously should there be a momentary lag in the driving action the spring means in expanding enables the driving member to continue its speed by movement in a substantially undiminished rate. Also, this spring means reacts to cushion jars incident to the stopping of the rotation of the elements in much the same manner as in the case of the momentary lag. In fact, my novel spring members re-act as a cushioning means throughout the time which the coupling is operated, thus enabling the shafts, associated therewith, to, at all times, run smoothly.

In conclusion, I wish to lay particular emphasis upon the fact that my novel half-links or spring leaves constitute the flexible non-stretching members of my links whereas the compression spring provides the medium therefore of elongation and contraction.

It is to be understood that my invention is not to be limited by the above descriptions of the several forms of my invention, but only in so far as defined by the scope and spirit of the appended claims.

I claim:

1. In a coupling, a driving member, a driven member, a first link element connected at one end to the driving member, a second link element connected at one end to the driven member, and resilient means associated with the free ends of the said elements, said link elements being bendable laterally to compensate for longitudinal play between the said members 2. In a coupling, a driving member, a driven member, a first link element associated with the driving member, a second link element associated with the driven member, and resilient means through which a portion of each of the elements pass for permitting relative movement between the said elements and for returning them to their normal positions, said link members being twistable to compensate for any disalignment of the members.

3. In a coupling, a driving member, a driven member, a plurality of link elements connected to one of the members and a plurality of link elements connected to the other member, said link elements overlapping each other and being connected in such a manner as to permit of relative movement between them, said link elements being bendable laterally to compensate for longitudinal play between the said members.

4. In a coupling, a driving member, a driven member, and a link connecting the said members comprising a plurality of elements connected to one of the members, a plurality of elements connected to the other member, said elements overlapping each other, and resilient means for permitting one set of elements to slide on the other set of elements, both longitudinally and laterally.

5. In a coupling, a driving member, a driven member, a link comprising a plurality of laminations connecting the said members, and resilient means associated with the link intermediate its ends for permitting the laminations thereof to slide upon one another both longitudinally and laterally.

6. In a coupling, a driving member, a driven member, and a link connecting them comprising a plurality of leaves, each being connected at one end to one of the members, a plurality of leaves, each being connected at one end to the other member, the free ends of one set of leaves overlapping the free ends of the other set of leaves, and resilient means disposed intermediate and abutting the free ends of one set of leaves and the free ends of the other set of leaves.

7. In a coupling, a pair of flexible overlapped leaves and resilient means surrounding a portion of said leaves for permitting the said leaves to slide upon one another, said means serving to hold said elements in overlapped relation.

8. In a coupling, a link comprising at least three overlapped flexible elements and resilient means surrounding the said overlapped elements and disposed intermediate and abutting their ends, the said elements being identical in form and each comprising a stamping from a metallic sheet having a substantially flat shape.

9. In a coupling, a link comprising a link element, a resilient element through which an end of the said link element extends, and a second link element having one of its ends extending through the resilient element and overlapping the aforesaid end of the other link element, said link elements being bendable and twistable.

10. In a coupling, a first link member comprising a plurality of leaves, and a second link member associated with the said first link member and comprising a plurality of leaves, the leaves of the said first member overlapping the leaves of the said second member, said leaves being bendable and twistable laterally as well as movable both longitudinally and laterally.

11. In a coupling, a first link member, comprising a plurality of spaced leaves, and a second link member associated with the said first link member and comprising a plurality of spaced leaves staggered with respect to the leaves of the said first link member, the leaves of one member overlapping the leaves of the other member in such a manner as to permit of relative movement between them, said leaves being both bendable and twistable.

12. In a coupling, a link comprising a first link member, comprising a plurality of spaced elements, a second link member associated with the said first link member and comprising a plurality of spaced elements staggered with respect to the elements of the first link member, the elements of one member overlapping the elements of the other member and being adapted to slide thereon, and resilient means surrounding the overlapped portions of the elements and disposed intermediate and abutting their overlapped ends.

13. In a coupling, a pair of spiders, a first link element connected at one end to one of the spiders, a second link element connected at one end to the other spider and means associated with the free ends of the said elements for permitting relative movement between them, said link elements being both flexible and twistable.

14. In a coupling, a pair of spiders and a plurality of links connecting them, each link including a plurality of elements connected to one of the spiders, a plurality of elements connected to the other spider, and means associated with the free ends of the elements intermediate the ends of the link for permitting relative movement between the elements of the link, said link elements being bendable and twistable laterally.

15. In combination, a pair of coupling members, and a plurality of links for connecting said members, each link including a plurality of flexible cooperating elements and being extensible, bendable laterally, twistable and bendable edgewise.

16. In combination, a pair of coupling members, and a plurality of links for connecting them, each of said links comprising a plurality of parts, said parts being extensible periodically when the coupling members are unaligned, said parts being movable edgewise into an angle with respect to each other when the links are lengthened, said parts being bendable and flexible laterally to compensate for longitudinal play between the coupling members and said parts being twistable into a tortuous shape when the coupling members are angularly disposed.

17. In a coupling, a link comprising a plurality of overlapped flexible elements and resilient means surrounding the said overlapped elements and disposed intermediate their ends, the overlapped ends of the said elements being provided with means for retaining the resilient means in said intermediate position.

18. In a coupling, a link comprising a plurality of flexible overlapped elements and resilient means associated therewith for permitting said elements to slide upon one another in both longitudinal and lateral directions.

19. In a coupling, a link comprising a plurality of overlapped elements and resilient means associated therewith for permitting said elements to slide upon one another in both longitudinal and lateral directions, said elements being bendable and twistable.

20. In a coupling, a link comprising a plurality of overlapped elements, said elements being all identical in construction and each comprising a substantially flat metallic stamping, and resilient means associated therewith for permitting said elements to slide upon one another.

21. In a coupling, a link comprising a plurality of overlapped elements and resilient means associated therewith for permitting said elements to slide upon one another in both longitudinal and lateral directions, said resilient means consisting of a plurality of flexible elements, each including a single metallic stamping having a bowed shape.

22. In a coupling, a link comprising a plurality of overlapped elements, said elements being all identical in construction and each comprising a substantially flat metallic stamping, and resilient means associated therewith for permitting said elements to slide upon one another, said resilient means consisting of a plurality of flexible elements, each comprising a single metallic stamping bowed in shape.

23. A spring for holding the elements of a flexible coupling link together comprising a single metallic stamping having a bowed shape in order to give it resiliency.

24. A spring for a flexible coupling link comprising a single metallic stamping bowed in shape and having a transverse opening adapted to receive a link.

25. A spring for a coupling link assembly comprising a single metallic element substantially semi-elliptic in form and having a transverse aperture for receiving the elements of the link.

26. A spring for a flexible coupling link assembly comprising a single metallic stamping substantially semi-elliptic in form and having a substantially polygonal shaped transverse opening for receiving the elements of the link.

In witness whereof, I hereunto subscribe my name this 14th day of July, 1925.

HERMANN HILL.